United States Patent [19]

Iyer

[11] 4,336,179
[45] Jun. 22, 1982

[54] RESIN BINDERS FOR FOUNDRY SAND CORES AND MOLDS

[75] Inventor: Raja Iyer, Hazelcrest, Ill.

[73] Assignee: Acme Resin Corporation, Forest Park, Ill.

[21] Appl. No.: 245,294

[22] Filed: Mar. 19, 1981

[51] Int. Cl.$^3$ .............................................. C08L 61/06
[52] U.S. Cl. ..................................... 523/145; 164/21; 528/165; 524/594
[58] Field of Search .......................... 260/38, 998.18; 528/129, 165; 164/21

[56] References Cited

U.S. PATENT DOCUMENTS 3,755,229  8/1973  Johnson et al. ..................... 260/38
3,839,251  10/1974  Bornstein ............................ 528/165
4,055,528  10/1977  Kim ..................................... 528/165

FOREIGN PATENT DOCUMENTS 524406  8/1940  United Kingdom ................ 525/165

Primary Examiner—Lewis T. Jacobs
Attorney, Agent, or Firm—Stanley M. Parmerter

[57] ABSTRACT

A granular composition is provided that is especially useful for the preparation of foundry cores and molds. Incorporated in the composition is a novel resin binder that imparts rapid curing properties to the composition.

20 Claims, No Drawings

RESIN BINDERS FOR FOUNDRY SAND CORES AND MOLDS

FIELD OF THE INVENTION

This invention relates to an improved phenolic resin binder useful for making foundry sand cores and molds.

BACKGROUND OF THE INVENTION

Binders or binder systems for foundry cores and molds are known. Generally, such binders should provide cores and molds which exhibit good thermal and dimensional stability in order to result in good dimensionally accurate metal castings. In addition, such binder systems should have rapid curing times and exhibit uniform curing properties, that is, the centers of cores or molds made therefrom should be as well cured and as strong as their surfaces in order to minimize breakage or warpage.

In the foundry art, cores or molds for making metal castings are normally prepared from a mixture of an aggregate material, such as sand, and a binding amount of a binder or binder system. Typically, after the aggregate material and binder had been mixed, the resulting mixture is rammed, blown or otherwise formed to the desired shape or patterns and then cured with the use of catalysts and/or heat to a solid, cured state.

A variety of different processes for forming molds and cores have been developed in the foundry industry. One type of process known as the "hot-box" process requires that the mixture of aggregate material and binder be cured and hardened in a holding pattern or core box while subjected to heat. Another type of binder system which does not require heating in order to bring about curing or hardening, is known as a "no-bake" process.

Phenol-formaldehyde resins have been used as binders in both the "hot-box" and "no-bake" processes. Although the phenol-formaldehyde resins offer a favorable raw material cost when compared with other resins used in these processes, they have not always cured as rapidly as desired in certain applications.

The present invention is directed to the preparation of phenolic resin systems with improved curing speeds which may be used in "no-bake" or "hot-box" systems, or in other systems where a faster curing phenolic resin is desirable.

SUMMARY OF THE INVENTION

In accordance with this invention, there is provided a free-flowing granular material for the preparation of foundry cores and molds. This material comprises an intimate mixture of sand, an acidic catalyst, and a resin binder. The improvement comprises using as a binder a phenolic resole resin solution prepared by a four-step process. A phenol is first heated with a molar excess of an aldehyde in a range of from about 1.1 to about 2.5 moles of aldehyde per mole of the phenol in an aqueous medium with a basic catalyst. The mixture is then concentrated by evaporation under reduced pressure until the water content is less than about 25% by weight. The concentrated mixture is then cooled, and an amount of phenol equal to at least about 3% by weight of the phenol in the mixture is added to the cooled concentrated mixture to give a material with improved curing speed.

Additionally, in accordance with this invention, there is provided shaped foundry cores or molds and a process for their manufacture. This process comprises mixing sand with an acidic catalyst and a resin binder, forming the mixture of sand, catalyst and resin binder to a desired shape and curing the mixture. The improvement in this process comprises using as the binder a phenolic resole resin solution prepared by a four-step process. A phenol is first heated with a molar excess of an aldehyde in a range of from about 1.1 to about 2.5 moles of aldehyde per mole of the phenol in an aqueous medium with a basic catalyst. The mixture is then concentrated by evaporation under reduced pressure until the water content is less than about 25% by weight. The concentrated mixture is then cooled, and an amount of a phenol equal to at least about 3% by weight of the phenol in the mixture is added to the cooled concentrated mixture to give a material with improved curing speed.

Finally, there is provided a free-flowing granular material for the preparation of foundry cores and molds comprising an intimate admixture of sand and a resin binder together with a process for forming shaped foundry cores and molds from the free-flowing granular material.

DETAILED DESCRIPTION OF THE INVENTION

The phenolic resin component used in the practice of this invention is a resole resin formed by the reaction of a phenol with a molar excess of an aldehyde in the presence of a basic catalyst. The phenols employed in the formation of the phenolic resin are generally any of the monohydric phenols which may be utilized to prepare phenolic resins. The only limitation is that the resin formed from the phenolic material is one that forms a homogeneous solution in the aqueous medium employed. Exemplary phenols include phenol itself and the cresols.

The aldehyde employed in formation of the phenolic resin component employed in this invention may also vary widely. Suitable aldehydes include any of the aldehydes heretofore employed in the formation of phenolic resins such as formaldehyde, acetaldehyde, propionaldehyde, furfuraldehyde, and benzaldehyde. In general, the aldehydes employed have the formula RCHO, wherein R is a hydrogen or a hydrocarbon radical of 1 to 8 carbon atoms. The most preferred aldehyde is formaldehyde.

The basic catalysts used in the formation of the phenolic resin component employed in this invention include any of the catalysts heretofore employed in the formation of phenolic resins such as alkaline or alkaline earth hydroxides and organic amines. When the resin is prepared for use in a "no-bake" process, the preferred basic catalyst is calcium hydroxide. When the resin is prepared for use in a "hot-box" process, the preferred catalyst is sodium hydroxide. The amount of basic catalyst used to form the resole resin can vary widely. It is convenient to use between about 0.003 and 0.08 moles of catalyst per mole of phenol.

The preferred phenolic resin components employed in the practice of this invention are resole resins made from phenol and formaldehyde at a mole ratio of formaldehyde to phenol in the range of from about 1.1 to about 2.5. The most preferred mole ratio of formaldehyde to phenol is a mole ratio in the range of from about 1.3 to about 2.0. This mole ratio is calculated before the additional phenol is mixed with the resole resin.

The resole resins are made by treating the mixture of phenol and formaldehyde in an aqueous solution with the basic catalyst at a temperature at or below the boiling point of water, preferably at about 60° C. to about 90° C. until the free formaldehyde in the mixture is in the desired range. For resins used in the "no-bake" process, the preferred range of free formaldehyde is less than about 3% by weight. Reaction temperatures are controlled by conventional means such as heating, cooling, and/or portionwise addition of catalyst.

The phenolic resins used in the process of this invention must contain an added phenol. This gives sand-resin mixtures with faster curing speeds than those which contain no added phenol. The resole resin reaction mixture is cooled somewhat before the phenol is added. It is convenient to add the phenol to the resole resin after adjustment of the water content of the resin by evaporation under reduced pressure. The evaporation accomplishes both the cooling of the mixture and the lowering of its water content.

Any of the monohydric phenols useful for the preparation of the resole resin may be used as the added phenol. This added phenol may be the same or different than the phenol used in the preparation of the resole resin.

It has been found that blending a phenol with the phenolic resole resins commonly used in the "hot-box" and "no-bake" processes accelerates the curing rate of the resin-sand mixtures. Blends containing from about 3% to about 25% of the added phenol and from about 75% to about 97% of the phenolic resole resin are useful. A preferred formulation would include from about 5% to about 15% of the free phenol by weight. All percentages are by weight of the total phenol used in the blend of phenol and phenolic resin. Generally, the introduction of any amount of added phenol into the formulation will yield some benefit. However, the use of less than about 3% will result into too small an improvement to have commercial significance. If the total amount of the phenol added exceeds about 25%, it is possible that there may be a reduction in the final tensile strength of the mold or core.

The phenol and phenolic resole resin blend is used in a liquid form in the "hot-box" and "no-bake" processes. The viscosity of the solution is controlled by adjusting the amount of water present as well as by the amount of free phenol and other additives. Material with a viscosity of less than about 2000 centipoises, measured at 25° C., may be used. For resin blends to be used in the "no-bake" process, it is preferred that they have a viscosity in the range of from 50 to 250 centipoises. However, resins of over 1000 centipoises are acceptable in the "hot-box" process.

Any of the refractory aggregates commonly used to make foundry cores and molds can be mixed with the resin compositions of this invention. These include silica sands, lake sands, bank sands, zircon sand, chromite sand, olivine sand, and the like. Also, mixtures of these may be used.

It is possible to use the resins of this invention without a catalyst. However, acidic catalysts are generally employed for the production of foundry cores and molds. Any acidic catalysts ordinarily used for curing phenolic resins may be utilized. Acids that are generally useful in the "no-bake" process are strong organic acids, strong mineral acids and combinations of these. Exemplary are such acids as benzene sulfonic acid, xylene sulfonic acid, p-toluene sulfonic acid, sulfuric acid, and mixtures thereof. Acidic catalyst useful in the "hot-box" process include acidic salts, such as ammonium chloride, ammonium nitrate, and ferric chloride.

It is often the practice in the foundry art to include a variety of additives in the resins used to prepare foundry cores and molds. These additives include such materials as silanes, sources of fluoride ion, deodorizing agents and the like. When the resins are used in "no-bake" applications, it is often convenient to add urea which combines with the free formaldehyde present. When the resins are used in "hot-box" applications, they are frequently combined with urea-formaldehyde resins. Such additives may be used in the resins of the present process and do not interfere with the improved curing speeds obtained with these resins.

The process for forming "no-bake" and "hot-box" cores and molds according to this invention involves mixing sand with an acidic catalyst and a resin material as herein described. This invention involves bringing the novel resin-sand-catalyst mixture into contact with metal patterns to form cores or molds suitable for casting metal, curing the core or mold and removing it from the pattern. The temperatures and procedures involved in forming the molds and cores are those generally employed in the art.

The following examples illustrate the invention. It is to be understood that the examples are illustrative only and do not intend to limit the invention in any way. In the examples, all parts and percentages are by weight, the temperatures are degrees centigrade and the viscosity values are centipoises unless otherwise indicated.

EXAMPLE 1

A mixture of 560 g of 50% formaldehyde, 188 g of water, 603 g of phenol and 4.1 g of calcium hydroxide was stirred at a temperature of 80° C. for 2 hours. The temperature was raised to 85° C. and held there for an additional hour. The pH of the mixture was adjusted to 6.6 with dilute hydrochloric acid before the solution was concentrated under reduced pressure to a water content of 16.34%. To the cooled mixture was added 65 g of phenol, 10 g of urea, 2.4 g of ammonium bifluoride and 2.5 g of Silane A-1100 (a silane coupling agent available from the Union Carbide Corporation). The pH of the mixture was adjusted to 6.0–6.5 by the addition of dilute sodium hydroxide solution. The material had a viscosity of 145 centipoises (25° C.), a water content of 15.7% and a free formaldehyde content of 0.87%.

Comparative Test 1

A mixture of 560 g of 50% formaldehyde, 188 g of water, 603 g of phenol and 4.1 g of calcium hydroxide was stirred at a temperature of 80° C. for 2 hours. The temperature was then held at 85° C. for an additional hour. The pH of the mixture was adjusted to 7.6 with dilute hydrochloric acid before it was concentrated under reduced pressure to a water content of 15%. To the cooled mixture was added 10 g of urea, 2.4 g of ammonium bifluoride, and 2.4 g of Silane A-1100. The pH of the mixture was adjusted to 6.0–6.5 by the addition of dilute sodium hydroxide solution. The material had a viscosity of 152 centipoises (25° C.), a water content of 16.2%, and a free formaldehyde content of 0.39%.

The following sand tests were performed using the resin compositions of Example 1 and Comparative Test 1. To a K-45 Kitchen Aid mixer was added 2500 grams of Wedron 7020 washed and dried silica sand. The sand was brought to a temperature of 23.5° C., 8 g of a benzene sulfonic acid-based catalyst containing 81% benzene sulfonic acid, 5% sulfuric and 14% methanol, was added and the combination was mixed for 1 minute. Then 25 g of the resin was added before mixing was continued for another minute. Part of the sand was immediately used to form standard American Foundry Society 1-inch dog bone tensile briquets, in a Dietert No. 696, 12-cavity tensile core box. The cores were cured at room temperature and broken at 2, 4 and 24 hours after the mix was made. Tensile strength measurements were made using a Detroit Testing Machine Company, Model CST tensile tester. Average tensile data are given in Table I. The rest of the sand was used to make a truncated pyramid core 12 inches high, 4 inches square at the base, and 2 inches square at the top, using a Dietert 623-50 core box. Sand was poured onto the core box, jolted 4 times using a Dietert 623 core jolter. A thermometer was inserted about 6 inches into the core. The stripping time or deep set time was determined as the time at which the core was cured so hard that the thermometer could no longer be pushed by hand deeper into the core. This strip time has also been called the deep-set time. The results are given in Table I.

TABLE I

| Resin | Strip Time (minutes) | Tensile Strength (lb per sq in.) | | |
|---|---|---|---|---|
| | | 2 hr | 4 hr | 24 hr |
| Example 1 | 23 | 228 | 353 | 233 |
| Comparative Test 1 | 27.3 | 310 | 338 | 265 |

As can be seen from the data in Table I, the core prepared with the resin composition of this invention (Example 1) exhibited a shorter strip time than that prepared from the prior art resin of Comparative Test 1.

EXAMPLE 2

The general procedure of Example 1 was followed using 38.25 g of 50% formaldehyde, 14.49 g of water, 41.62 g of phenol and 0.22 g of calcium hydroxide. After evaporation of the excess water, 0.8 g of urea, 4.0 g of m-cresol and 0.15 g of Silane A-1100 were added. The viscosity of the resin composition was 225 centipoises (25° C.) and it contained 11.5% water and 1.71% free formaldehyde.

EXAMPLE 3

For comparison purposes, a second resin was prepared by the same procedure used for Example 2 except that 4.0 g of phenol was added in place of the 4.0 g of m-cresol. This resin composition had a viscosity of 185 centipoises (25° C.), and contained 12.4% water and 1.68% free formaldehyde.

The resin compositions of Examples 2 and 3 and a prior art resin containing no added phenol were used to make sand test cores. These cores were prepared and tested by the same procedure as that used to test the resin composition of Example 1. Test results are given in Table II.

TABLE II

| Resin Composition | Strip Time (minutes) | Tensile Strength, psi | |
|---|---|---|---|
| | | 2 hr | 24 hr |
| m-cresol added (Example 2) | 13 | 225 | 228 |
| Phenol added (Example 3) | 14 | 273 | 303 |
| Nothing added (Prior Art Resin) | 17 | 318 | 368 |

As can be seen from the data in Table II, cores bound with the resin compositions containing added m-cresol or added phenol show considerably faster strip times than the one prepared without the added phenolic components.

EXAMPLE 4

The general procedure of Example 1 was repeated using 1693 g of 37% formalin and 1367 g of phenol with 4.2 g of calcium hydroxide catalyst. Free formaldehyde in the solution after heating was 1.47% before evaporation. The resole resin was concentrated by evaporation under reduced pressure to a refractive index of 1.570 (25° C.) and 147 g of phenol was added. The pH of the resole was adjusted to 7.1 with a small amount of dilute hydrochloric acid before the refractive index of the material was adjusted to 1.5508 (25° C.) by the addition of water.

Comparative Test 2

For comparison purposes, test material (not the resin of this invention) was prepared by the procedure used for the resin composition of Example 4 except that 1514 g of phenol was used in the initial reaction mixture and no phenol was added after the reaction was completed. The resulting resin showed a viscosity of 140 centipoises (25° C.), a pH of 7.15 and a refractive index of 1.5500 (25° C.).

EXAMPLE 5

Sand cores were prepared and strip times were measured using the resin materials of Example 4 and Comparative Test 2. The procedure used was that described for testing the resin of Example 1. The resin of Example 4 gave a core with a strip time of 26.3 minutes, whereas the core prepared with the Comparative Test 2 resin (not a material of this invention) gave a strip time of 41.5 minutes. Gel times were also run on the resins using a Sunshine Scientific Instrument gel time meter, Catalog No. 22, manufactured by the Sunshine Scientific Instrument Company of Philadelphia, Pa. In an average of two determinations, the gel time of the resin of Example 4 measured at 100° C. was 60.1 minutes, whereas the gel time at 100° C. of the Comparative Test 2 resin was 69.3 minutes.

As can be seen from these test results, the resin composition of Example 4 shows a faster gel time and binds cores with much shorter strip times than those of the comparable prior art products. This further exemplifies the superior faster curing properties of the resins of this invention.

EXAMPLE 6

This example demonstrates the preparation of a resin by the method of this invention that is useful as a "hotbox" resin.

A mixture of 1500 parts of 50% formaldehyde, 1400 parts of phenol and 15 parts of a 50% solution of sodium hydroxide in water were stirred at a temperature of 80° C. for 45 minutes. This temperature was maintained with the use of cooling water or heat as required. Then another 30 parts of 50% sodium hydroxide was added and the reaction was continued at 80° C. for an additional 75 minutes. The resole resin solution was cooled and evaporated until the refractive index of the mixture was 1.573 (25° C.). To the solution was added 100 parts of phenol, 15 parts of 35% hydrochloric acid, and 1740 parts of Staform 60. (Staform 60 is a product of the Georgia Pacific Corporation containing 60 parts of formaldehyde, 25 parts of urea and 15 parts of water.) The mixture was further concentrated by vacuum evaporation to a viscosity of 992 centipoises (25° C.). This "hot-box" resin material had a refractive index of 1.534 (25° C.) and a pH of 8.0

Comparative Test 3

A comparative test sample was prepared without the addition of phenol to the resole resin. This comparative test sample was prepared as was the material of Example 6 except that in the first stage 1500 parts of phenol were employed and no phenol was added after the vacuum concentration. This Comparative Test 3 resin had a viscosity of 992 centipoises (25° C.) and a pH of 8.03.

EXAMPLE 7

This example illustrates the making of sand cores using the compositions of Example 6. To a Hobart A-120 mixer, there was added 2500 g of 20 KK lake sand. The mixer was started and 10 g of a powdered catalyst containing 12.3% of ammonium chloride and 87.7% urea was added while mixing was continued for 30 seconds. Then 5 g of water was added and the mixing was continued for an additional 60 seconds. Fifty g of the resin material was then added and the mixing was continued for a total of 270 seconds. This coated "hot-box" sand was then tested for cold tensile strength, hot strip strength and core warp resistance.

To measure for cold tensile strength, a part of the coated sand was placed in a blow magazine and blown under 80 psi air pressure into the 3-cavity core box of a Dietert No. 372 hot box tensile curing machine. This core box was adjusted to 400° F. to cure the sand into 1-inch thick dog bone tensile specimens. Cores were made at different cure times and allowed to cool to room temperature. Three cores made at each cure time were broken in a Detroit Testing Machine Company CST tensile tester and the average was reported as the cold tensile strength.

The hot strip strength test was run using a Dietert No. 615 hot box stripping strength tester. Part of the coated sand was blown at 80 psi air pressure into the 1-cavity core box heated at 450° F. The 1-inch tensile specimen was cured for 40 seconds, at which time the core was broken in place by this machine. Three cores were blown, cured and broken to determine an average hot strip strength.

Core warp resistance was measured using a No. 648 BCIRA-Dietert test piece blower. This machine employs a slotted die that makes a $1 \times \frac{1}{4} \times 4\frac{1}{4}$-inch test bar. The die is clamped between 2 heated blocks which heat the steel die to the same temperature as the blocks. Coated sand is blown through the slot into the die where it is cured. The die is then unclamped and removed from the machine and the test core bar in turn is removed from the die. This test bar is then immediately placed on a frame that supports the bar at each end. A $1 \times 1$-inch steel bar weighing 272.5 g is then immediately placed on top of the test bar at its center. At this point, the test bar may or may not bend or break depending on the cure time and inherent warp resistance of the resin. The amount of warp is reported as the distance in millimeters between the center of 2 bars placed face-to-face. This warp test was run at 15, 20 and 25 seconds cure time. The results of these tests are reported in Table III.

TABLE III

| | Example 6 Resin | Comparative Test 3 Resin |
|---|---|---|
| Cold Tensile Strength (psi) | | |
| Cure, seconds - 10 | 103 | 103 |
| 20 | 293 | 287 |
| 30 | 367 | 305 |
| 40 | 437 | 378 |
| Hot Strip Strength (psi) | | |
| Cure, seconds - 40 | 58 | 32 |
| Warp Test | | |
| Cure, seconds - 15 | bars broke | bars broke |
| 20 | bars broke | bars broke |
| 25 | 0.5 mm | 5.0 mm |

These results demonstrate that the phenolic resole resin materials of this invention, which contain an added phenol, provide much faster curing rates than prior art resins when they are used as resin binders in "hot-box" systems. This is particularly evident in the much higher hot strip strength of the cores cured for 40 seconds and the much smaller deflection of the warp test samples cured for 25 seconds than those shown by the cores prepared using the comparative test resin of the prior art.

Thus, it is apparent that there has been provided, in accordance with the invention, a material for the preparation of foundry cores and molds that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to include all such alternatives, modifications, and variations as set forth within the spirit and scope of the appended claims.

What is claimed is:

1. In a free-flowing granular material for the preparation of foundry cores and molds comprising an intimate admixture of sand, an acidic catalyst and a resin binder, the improvement comprising using as said binder, a phenolic resole resin solution prepared by:
    (a) heating a mixture comprised of a phenol and a molar excess of an aldehyde in the range of from about 1.1 to about 2.5 moles of aldehyde per mole of the phenol in an aqueous medium with a basic catalyst;
    (b) concentrating the mixture by evaporation under reduced pressure until the water content is less than about 25% by weight;
    (c) cooling the concentrated mixture; and
    (d) adding to the cooled concentrated mixture an amount of a phenol equal to at least about 3% by weight of the phenol in the mixture to give a material with improved curing speed.

2. The granular material of claim 1 wherein the molar excess of aldehyde used in the mixture is in the range of from about 1.3 to about 2.0 moles of aldehyde per mole of phenol.

3. The granular material of claim 1 wherein the basic catalyst is calcium hydroxide.

4. The granular material of claim 1 wherein the basic catalyst is sodium hydroxide.

5. The granular material of claim 1 wherein the phenol added to the cooled concentrated mixture is m-cresol.

6. The granular material of claim 1 wherein the phenol added to the cooled concentrated mixture is unsubstituted phenol.

7. The granular material of claim 1 wherein the phenol used in the mixture that is heated is unsubstituted phenol and the aldehyde is formaldehyde.

8. The granular material of claim 7 wherein the molar excess of aldehyde used in the mixture is in the range of from about 1.3 to about 2.0 moles of aldehyde per mole of phenol, the basic catalyst is calcium hydroxide and the phenol added to the cooled concentrated mixture is unsubstituted phenol.

9. In a process for forming foundry cores and molds comprising the steps of mixing sand with an acidic catalyst and a resin binder, forming the mixture of said sand, catalyst and resin binder to a desired shape, and curing the mixture, the improvement comprising using as said binder, a phenolic resole resin solution prepared by:
(a) heating a mixture comprised of a phenol and a molar excess of an aldehyde in the range of from about 1.1 to about 2.5 moles of aldehyde per mole of the phenol in an aqueous medium with a basic catalyst;
(b) concentrating the mixture by evaporation under reduced pressure until the water content is less than about 25% by weight;
(c) cooling the concentrated mixture; and
(d) adding to the cooled concentrated mixture an amount of a phenol equal to at least about 3% by weight of the phenol in the mixture to give a material with improved curing speed.

10. The process of claim 9 wherein the molar excess of aldehyde used in the mixture is in the range of from about 1.3 to about 2.0 moles of aldehyde per mole of phenol.

11. The process of claim 9 wherein the basic catalyst is calcium hydroxide.

12. The process of claim 9 wherein the basic catalyst is sodium hydroxide.

13. The process of claim 9 wherein the phenol added to the cooled concentrated mixture is m-cresol.

14. The process of claim 9 wherein the phenol added to the cooled concentrated mixture is unsubstituted phenol.

15. The process of claim 9 wherein the phenol used in the mixture that is heated is unsubstituted phenol and the aldehyde is formaldehyde.

16. The process of claim 15 wherein the molar excess of aldehyde used in the mixture is in the range of from about 1.3 to about 2.0 moles of aldehyde per mole of phenol, the basic catalyst is calcium hydroxide and the phenol added to the cooled concentrated mixture is unsubstituted phenol.

17. The shaped foundry core or mold formed by the process of claim 9.

18. The shaped foundry core or mold formed by the process of claim 16.

19. In a free-flowing granular material for the preparation of foundry cores and molds comprising an intimate admixture of sand and a resin binder, the improvement comprising using as said binder, a phenolic resole resin solution prepared by:
(a) heating a mixture comprised of a phenol and a molar excess of an aldehyde in the range of from about 1.1 to about 2.5 moles of aldehyde per mole of the phenol in an aqueous medium with a basic catalyst;
(b) concentrating the mixture by evaporation under reduced pressure until the water content is less than about 25% by weight;
(c) cooling the concentrated mixture; and
(d) adding to the cooled concentrated mixture an amount of a phenol equal to at least about 3% by weight of the phenol in the mixture to give a material with improved curing speed.

20. In a process for forming foundry cores and molds comprising the steps of mixing sand with a resin binder, forming the mixture of said sand and resin binder to a desired shape, and curing the mixture, the improvement comprising using as said binder, a phenolic resole resin solution prepared by:
(a) heating a mixture comprised of a phenol and a molar excess of an aldehyde in the range of from about 1.1 to about 2.5 moles of aldehyde per mole of the phenol in an aqueous medium with a basic catalyst;
(b) concentrating the mixture by evaporation under reduced pressure until the water content is less than about 25% by weight;
(c) cooling the concentrated mixture; and
(d) adding to the cooled concentrated mixture an amount of a phenol equal to at least about 3% by weight of the phenol in the mixture to give a material with improved curing speed.

* * * * *